INVENTOR:
P. C. P. HARTMANN
BY:
HIS ATTORNEY

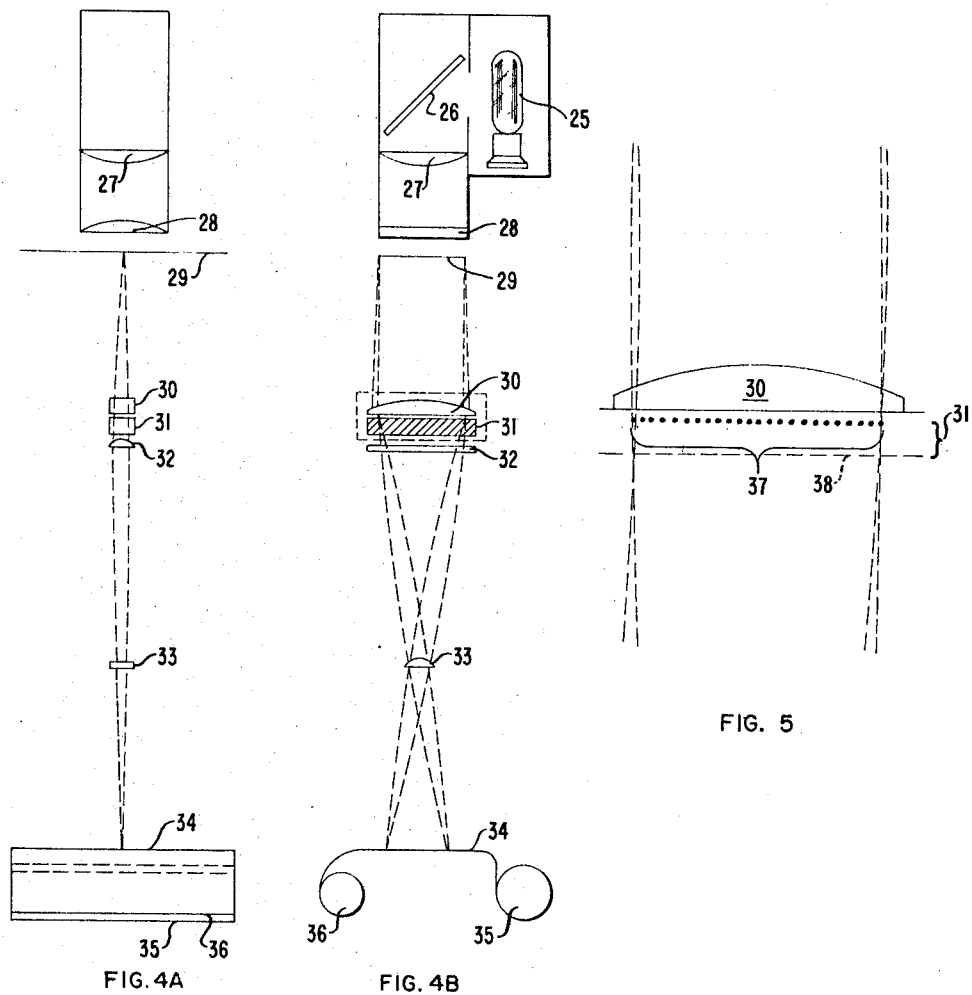

INVENTOR:
P. C. P. HARTMAN
BY:
HIS ATTORNEY

United States Patent Office 3,449,047
Patented June 10, 1969

3,449,047
PROCESS AND APPARATUS FOR THE PRODUCTION OF A DERIVED SEISMOGRAM
Philippus C. P. Hartmann, The Hague, Netherlands, assignor to Shell Oil Company, New York, N.Y., a corporation of Delaware
Filed Oct. 24, 1966, Ser. No. 588,823
Claims priority, application Netherlands, Oct. 27, 1965, 6513889
Int. Cl. G03b 27/32
U.S. Cl. 355—2                                6 Claims

ABSTRACT OF THE DISCLOSURE

A system for the production of a derived seismogram from a number of different original seismograms which form a multiple source of information. The device used for producing the derived seismogram displays the original seismograms in a side by side relationship which is recorded on a movable light sensitive medium by the use of an optical system. The optical system serves to reduce the trace width while maintaining substantially the original trace distance.

---

The invention relates to a process and apparatus for the production of a derived seismogram, starting from a number of original seismograms which together form a multiple source of information concerning the soil to be investigated, and an optical system which can be used in this apparatus.

The present invention is of particular interest for geophysical soil investigation in which a series of consecutive seismic pulses are used to obtain a number of seismograms. The seismograms form a multiple source of information concerning the soil being investigated. In this method seismic pulses are consecutively created at various points and the resulting seismic waves are picked up by geophones and recorded. In this way a seismogram, referred to hereinafter as the original seismogram, is obtained from each seismic pulse. In the various recordings the geophones are repeatedly shifted in such a way that a number of recording traces are obtained from the same underground reflection point or limited area around it. The recorded traces thus represent seismic reflections at various angles from the same reflection point, the waves having traveled along various paths.

The original seismograms obtained by the above process are combined into a derived seismogram in such a way that each of the recorded traces that relate to the same reflecting area form a group of juxtaposed traces, while adjacent reflecting areas are represented by adjacent groups of such traces.

The present invention provides a process and a device by means of which this derived seismogram can be simply, rapidly and effectively produced. According to the invention the various original seismograms are consecutively reproduced by means of an optical system on a light-sensitive medium, the traces that are to be transferred from a given original seismogram to the derived seismogram being reproduced together. In the reproduction the ratio of trace width to trace distance characteristic of the original seismogram is reduced, so that the trace distance on the image is at least equal to the width of the image of a trace. After this reproduction of an original seismogram the light-sensitive medium is shifted—at least relatively to the optical system—in a direction normal to the longitudinal direction of the traces before a subsequent original seismogram is reproduced.

The term trace width is used to describe the distance from edge to edge of a single trace while trace distance is used to describe the distance between the two consecutive edges of adjacent traces.

After the light-sensitive medium is shifted, the traces of a subsequent original seismogram can be reproduced in the spaces beside and between the already reproduced traces. This procedure is repeated until all the traces forming a group of juxtaposed traces are reproduced on the derived seismogram. The adjacent reflecting areas will be represented by adjacent groups on the derived seismogram.

In an attractive embodiment of the process according to the invention substantially only the trace width is reduced, preferably by a factor equal or substantially equal to the number of juxtaposed traces originating from the various original seismograms and forming one group of traces in the derived seismogram.

This embodiment of the invention ensures that in the derived seismogram an entire group of traces belonging together is reproduced in the space occupied by a single trace in the original seismogram. The human eye can now observe this group of juxtaposed traces as if it were a single trace; in other words the human eye can integrate these juxtaposed traces. In addition, the derived seismogram having substantially the same dimensions as an original seismogram provides a multiple source of information, the degree of multiplicity being equal to the number of traces in one group of the derived seismogram.

The present invention also relates to an apparatus suitable for carrying out the above-described method. The apparatus according to the invention comprises an optical system by means of which the traces to be transferred from an original seismogram can be reproduced together on a light-sensitive medium in such a way that the ratio of trace width to trace distance characteristic of the original seismogram is reduced. In addition a means is provided for shifting the light-sensitive medium—at least relatively to the optical system—in a direction normal to the longitudinal direction of the traces.

The apparatus according to the invention preferably comprises a transport system by means of which the light-sensitive medium can be shifted in a direction normal to the longitudinal direction of the traces. A transport system of this type has the advantage that the optical system can be mounted rigidly and the seismogram which is to be reproduced can also be fixed, at least in the lateral direction. The invention further relates to an optical system suitable for use with the apparatus.

The optical system according to the invention comprises a mask having a number of parallel slits and a number of lenses, at least one opposite each slit. With an optical system of this kind it is possible to reproduce each of the traces separately. A slit with at least one corresponding lens is provided for each trace to be reproduced. A lens of this type, which is usually comparatively small, forms an image which is substantially limited by means of the mask to the image of the trace to be reproduced. Care is preferably taken to ensure that the light coming from the area surrounding the relevant trace is substantially blocked out while the light coming from this trace itself passes through the slit.

In order to reduce each of the traces in only the lateral direction use is made of cylindrical lenses, which are positioned parallel with the slits. In the preferred embodiment of the optical system the lenses are adjustably arranged with respect to the slits in the mask. For this purpose the optical system comprises a base on one side of which the mask is perpendicularly mounted, a groove in the opposite side of this base, parallel to this mask, and lenses mounted on supports which can be moved in the groove in such a way that each lens can be accurately lined up with an appropriate slit.

The above advantages of the invention will be more easily understood from the following detailed description of a preferred embodiment when taken in conjunction with the attached drawings in which:

FIGURE 4A is a front view of an apparatus for carrying out the present invention;

FIGURE 4B is a side view of the apparatus shown in FIGURE 4A;

FIGURE 5 illustrates the optical system of the apparatus of FIGURE 4 to an enlarged scale;

FIGURE 9 illustrates the twenty-four seismograms obtained with the method of FIGURE 8 using six shot points.

Figure 1:
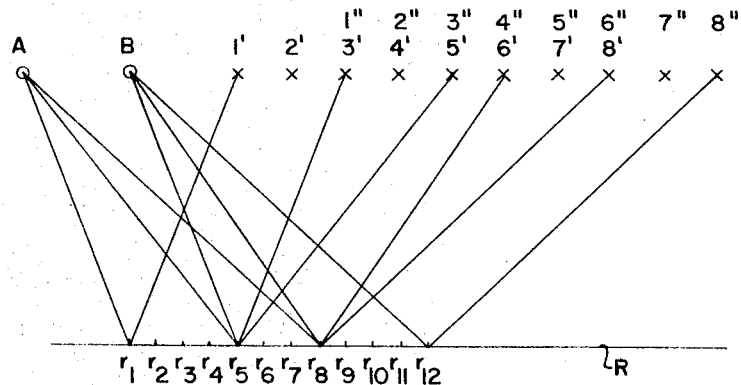
FIGURE 1 illustrates the method for obtaining the original seismograms.

FIGURE 1 shows a method for carrying out geophysical soil investigation which can be employed to obtain the type of data used in the present invention. With reference to the figure, A and B indicate the points (hereinafter called the shot points) at which seismic pulses are consecutively generated. R is an underground reflecting layer with reflection points $r_1, r_2 \ldots r_{12}$. For the sake of simplicity only a single reflecting layer is shown in the drawing, but in practice there are generally many more. There is also a number of geophones, numbered $1'$ to $8'$ and $1''$ to $8''$, respectively.

The process in the field is as follows. A seismic pulse is first of all created in the shot point A. The seismic waves resulting therefrom reflect from the reflecting layer R at the points $r_1$ to $r_8$, inclusive, and are subsequently received by the geophones $1'$ to $8'$, it being understood that the seismic wave which has reflected in $r_1$ is received by geophone $1'$, the wave from $r_3$ by geophone $3'$, etc. The distance from the shot point A to the first geophone $1'$ is in this case equal to four times the present distance between two consecutive geophones; other distances are possible, however. It should be noted that many more geophones may be used. For example 24 are normally used; however, only 8 geophones are shown in the figure. The signals produced by the geophones in response to the incoming seismic waves are recorded. In this way a seismogram is obtained on which, in the present case, 8 traces are arranged in side-by-side relationship.

The geophones and the shot point are now shifted over a like distance (in this case equal to twice the distance between 2 consecutive geophones) in the same direction. For the sake of clarity the geophones are now numbered from $1''$ to $8''$ inclusive. The geophone $1''$ is now located at the place where the geophone $3'$ was located in the case of shot point A, etc. Instead of shifting the geophones it is possible to operate the desired geophones from a fairly long series of geophones already fixed in position. The geophones $1''$ to $8''$ inclusive now receive the seismic waves which result from the pulse created in the shot point B. The signals produced by the geophones $1''$ to $8''$ inclusive relate to the reflection points $r_5$ to $r_{12}$ inclusive. The signal from geophone $5'$ in case A, for instance, relates to the same reflection point ($r_5$) as the signal from geophone $1''$ case B; similarly, the signal from geophone $6'$ relates to the same reflection point ($r_6$) as the signal from geophone $2''$. Signals coming from the reflection points $r_7$ and $r_8$ are also produced by the geophones $7'/3''$ and $8'/4''$, respectively.

The two seismograms thus provide a twofold information source (information number $m=2$) of a part ($r_5$ to $r_8$ inclusive) of the investigated soil.

The geophones and the shot point are subsequently again shifted over the same distance and in the same direction (not shown), whereupon a third seismogram is obtained. In general, a large number of seismograms is produced in this way, thus providing a multiple source of information concerning the soil to be investigated.

Figure 2:
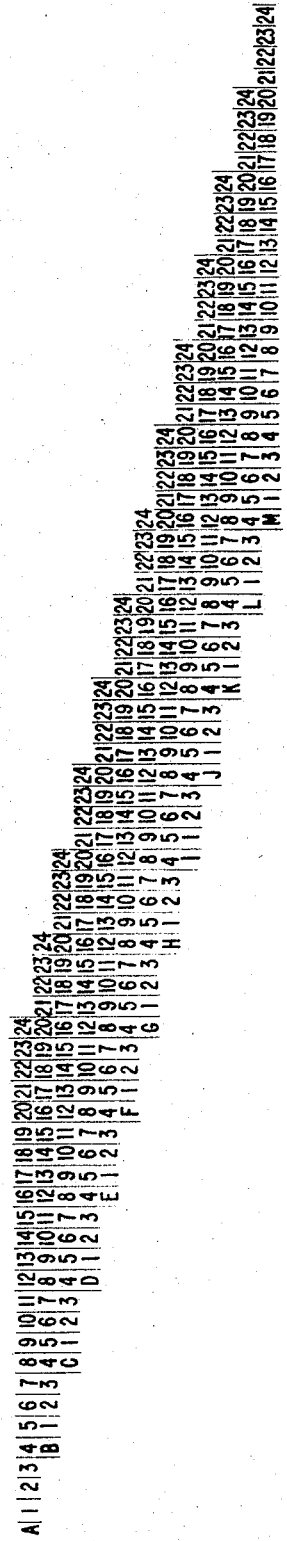
FIGURE 2 illustrates the various original seismograms to be composited.

Referring to FIGURE 2, the traces of various seismograms to be composited are shown by means of symbols. It was assumed in this case that the signals arising from one shot point were picked up by 24 geophones, instead of the 8 shown in FIGURE 1. In this case, moreover, the shot points and geophones were shifted in such a manner that a six-fold source of information was obtained. Thus, the shot in point A results in a seismogram on which the traces $A_1, A_2, A_3$ up to and including $A_{24}$ are present. The shot in point B gives a seismogram with the traces $B_1, B_2, B_3$ up to and including $B_{24}$ (trace $B_1$ corresponds to the trace originating from geophone $1''$ in FIGURE 1; similarly trace $B_2$ corresponds to the trace from geophone $2''$, and so on); a further shot point C gives a seismogram with the traces $C_1$ up to and including $C_{24}$, etc. FIGURE 2 shows the results of 13 shot points (A to M inclusive).

As has already been shown with reference to FIGURE 1, the trace $A_5$ originates from the same reflection point as the trace $B_1$. In the same way the traces $A_{21}, B_{17}, C_{13}, D_9, E_5$ and $F_1$ originate from one and the same reflection point. In FIGURE 2 the traces of the various original seismograms which relate to the same reflection point are placed vertically one below the other.

It can be seen from FIGURE 2, that from the sixth shot point (F) up to the last shot point but five (H) of the series a six-fold source of information (information number $m=6$) relating to the soil under investigation is obtained. This figure also shows that information originating from the same reflecting area is present on a maximum of six seismograms. This means, for example, that the information on seismogram G has no connection with any reflection points to which seismogram A relates. In practice the method is naturally repeated again and again until a six-fold source of information relating to the entire stretch of soil under investigation is obtained.

Figure 3A:
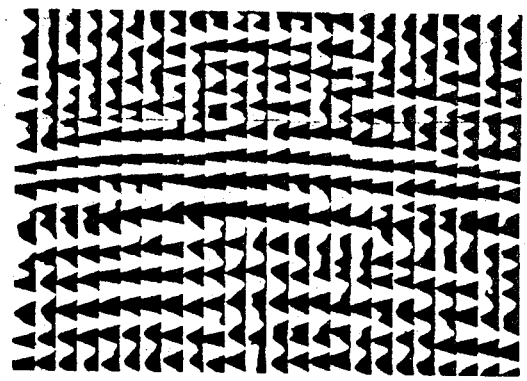
FIGURE 3A illustrates the original seismogram.
Figure 3B:
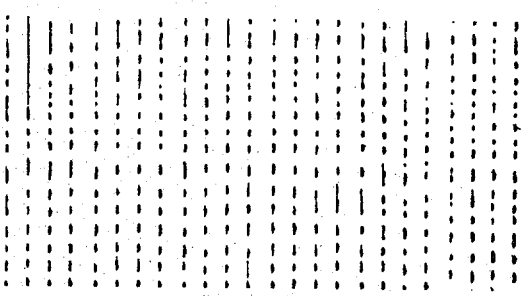
FIGURE 3B illustrates the original seismogram with the trace width reduced.
Figure 3C:
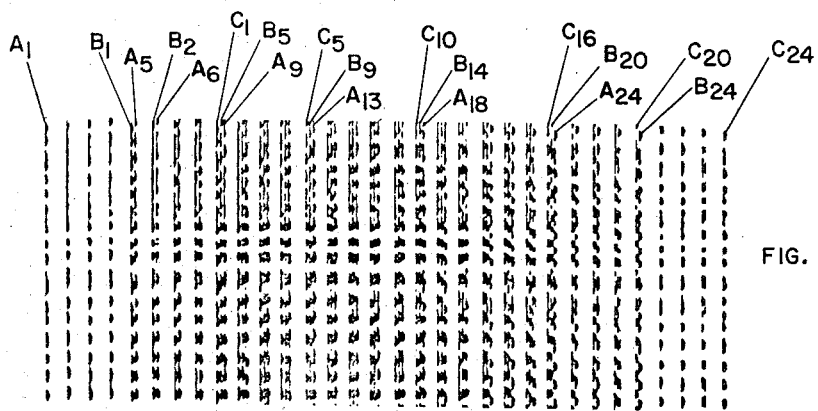
FIGURE 3C illustrates three of the original seismograms reproduced.

FIGURE 3a shows an original seismogram such as is obtained by the process discussed with reference to FIGURE 2. According to the present invention this seismogram is now reproduced on a light-sensitive medium in such a way that the ratio of trace width to trace distance characteristic of the original seismogram is reduced. FIGURE 3b shows this reproduction in which the trace width of the original traces has been substantially reduced. It is also possible to reproduce the traces in an unreduced form, in which case the spaces between the traces must be enlarged. For practical reasons, however, it is preferred to reduce the trace width. In the case shown the traces are shown reduced substantially by a factor of 6. In this reproduction there is now sufficient space between the traces to insert five or six other traces therein. It should be noted in this connection that the various trace distances on the reproduced seismogram are not all of the same size here (this will be explained later). FIGURE 3c shows a situation in which 3 original seismograms have been consecutively reproduced on the light-sensitive medium. This image was obtained by shifting the light-sensitive medium after the first seismogram (A) had been reproduced, whereupon the following seismogram B was reproduced. The light-sensitive medium was subsequently again shifted, whereupon seismogram C was recorded. This shift ensures that the traces of the various seismograms which relate to any one given reflection point are reproduced directly adjacent to one another. In the case shown the traces of a subsequent seismogram (B, C) are reproduced just to the left of the corresponding traces of the preceding seismogram (A and B respectively). Thus, in the reproduction trace $B_1$ is situated just to the left of trace $A_5$; trace $C_1$ is just to the left of $B_5$ and the latter is just to the left of $A_9$. This figure shows in sequence from left to right the traces: $A_1$; $B_1$, $A_5$; $B_2$, $A_6$; $C_1$, $B_5$, and $A_9$; $C_5$, $B_9$ and $A_{13}$; $C_{10}$, $B_{14}$ and $A_{18}$; $C_{16}$, $B_{20}$ and $A_{24}$; $C_{20}$, $B_{24}$; $C_{24}$.

Although in this case the traces of a subsequent seismogram were reproduced to the left of the traces of the preceding seismogram it is also possible to reproduce the traces of a following seismogram to the right of those from a preceding seismogram.

The remaining original seismograms are intercalated in a manner similar to that described above. Finally, a derived seismogram is obtained in which the six traces of each group in each case lie next to one another and all the intermediate spaces are filled up (except at the beginning and the end).

FIGURE 4A shows a front view and FIGURE 4B a side view of an apparatus by means of which the process according to the present invention (using a six-fold source of information) can be practiced. An incandescent lamp 25 transmits light to a mirror 26, which reflects the light. The light subsequently passes through lenses 27 and 28 and is concentrated on an original seismogram 29. The light (the limits of the beam are indicated by broken lines) then passes through a lens 30, an optical system 31 and lenses 32 and 33, whereupon it reaches a film 34. This film is secured to a transport device, which consists of two transport rolls 35 and 36.

The light coming from the incandescent lamp 25 is converted into a parallel beam by means of the mirror 26 and the lens 27.

The cylindrical lens 28 concentrates the beam to a point in the longitudinal direction (i.e. the direction of the time axis) of the seismogram 29 as shown in FIGURE 4a. This insures that the seismogram 29 is illuminated laterally (in a direction normal to the time axis) over the entire width along a single line. In the longitudinal direction, however, only one point is illuminated from each trace in the seismogram. The relevant point is reproduced (generally full size in the longitudinal direction) on the film 34 by means of the cylindrical lens 32. By now shifting both the seismogram and the film simultaneously in the longitudinal direction (the device used for this purpose is not shown) the seismogram is scanned point by point in the longitudinal direction and transferred to the film. During this scanning and reproduction operation the static and dynamic corrections can be made—usually with optical mechanical means.

The said parallel beam of light is maintained in the lateral direction of the seismogram as shown in FIGURE 4b in which the traces are juxtaposed. In the lateral direction of the seismogram a section is illuminated in the form of a strip, i.e. adjacent points of the juxtaposed traces are illuminated. Each of these points is reproduced on the film 34, while each trace is separately reduced in the lateral direction. For this purpose the adjacent points of the various traces are each separately reproduced in the optical system 31, it being possible at the same time to alter, if desired, the position of the traces relative to each other. This optical system will be dealt with in the discussion with reference to FIGURE 5. The latter image 31 is subsequently reproduced on the film 34 by means of the cylinder lens 33. In order to illuminate the film sufficiently the filament of the lamp 25 is projected onto the lens 33 by means of the lens 30. Any desired reduction of the traces can be effected by a suitable choice of lenses and distances between the various elements of the device.

Although in the device adjacent points of the various traces (which are adjacent to each other in the seismogram) are reproduced, it is also possible to reproduce from the various adjacent traces points which are somewhat displaced relative to each other in the longitudinal direction (direction of the time axis). This is usually the case when the static and dynamic corrections are made in the derived seismogram during the reproduction process. The rotatable mirrors commonly used for this purpose (one for each trace) can suitably be placed, in the various beams of light, between the lens 30 and the seismogram 29.

It has been explained above that the traces were scanned point by point in their longitudinal direction. It is, however, also possible to reproduce these traces completely in their longitudinal direction; in this case, of course relatively large lenses have to be used.

The optical system 31 is shown on an enlarged scale in FIGURE 5. The reference numeral 37 designates a number, in this case twenty-four, of relatively small cylindrical lenses and the reference numeral 38 designates a mask in which a number of parallel slits are arranged, one opposite each lens (i.e. a total of twenty-four). The optical system is positioned in the direction according to FIGURE 4 in such a way that each of the lenses 37 forms an image of a particular trace from the seismogram 29 together with the area immediately surrounding this trace; the lens furthest to the left forms an image of the trace furthest to the left on the seismogram, the following lens forms an image of the following trace and so on. The focal distance of the lenses is so chosen with respect to the distance from the lens to the original seismogram 29, that the trace width of the image formed by the lens is substantially equal to a sixth of the width of the original trace (the reduction by a factor of 6 or approximately 6 is directly related to the six-fold information source; an $m$-fold information source will require the reduction factor $m$ or substantially $m$).

The mask 38 is arranged in the plane in which the 24 images are formed by the lenses 37. The slits in the mask are of such dimensions and are arranged in such a way that only the image of the appropriate trace (i.e. the trace furthest left for the slit furthest left and so on) can be reproduced therein. The part of the image which relates to the area surrounding the trace is blocked off by the mask. The width of each of the slits is for this purpose made equal to the desired width of the image, in this case equal to approximately a sixth of the width of a trace on the original seismogram.

It will become clear from the following that when deciding on the dimensions of the mask it is often necessary to bear in mind the sequence in which the separate traces are produced in the derived seismogram. As pointed out in the discussion with reference to FIGURE 2, the traces of the various seismograms are reproduced in the following sequence:

$F_1, E_5, D_9, C_{13}, B_{17}, A_{21}$         $F_2, E_6, D_{10}, C_{14}, B_{18}, A_{22}$
$F_3, E_7, D_{11}, C_{15}, B_{19}, A_{23}$     $F_4, E_8, D_{12}, C_{16}, B_{20}, A_{24}$
$G_1, F_5, E_9, D_{13}, C_{17}, B_{21}$         $G_2, F_6, E_{10}, D_{14}, C_{18}, B_{22}$
$G_3, F_7, E_{11}, D_{15}, C_{19}, B_{23}$     $G_4, F_8, E_{12}, D_{16}, C_{20}, B_{24}$
$H_1, G_5, F_9, E_{13}, D_{17}, C_{21}$         $H_2, G_6, F_{10}, E_{14}, D_{18}, C_{22}$
$H_3, G_7, F_{11}, E_{15}, D_{19}, C_{23}$     $H_4, G_8, F_{12}, E_{16}, D_{20}, C_{24}$
$I_1, H_5, G_9, F_{13}, E_{17}, D_{21}$         $I_2, H_6, G_{10}, F_{14}, E_{18}, D_{22}$
$I_3, H_7, G_{11}, F_{15}, E_{19}, D_{23}$     $I_4, H_8, G_{12}, F_{16}, E_{20}, D_{24}$
$J_1, I_5, H_9, G_{13}, F_{17}, E_{21}$         $J_2, I_6, H_{10}, G_{14}, F_{18}, E_{22}$
$J_3, I_7, H_{11}, G_{15}, F_{19}, E_{23}$     $J_4, I_8, H_{12}, G_{16}, F_{20}, E_{24}$
$K_1, J_5, I_9, H_{13}, G_{17}, F_{21}$         $K_2, J_6, I_{10}, H_{14}, G_{18}, F_{22}$
$K_3, J_7, I_{11}, H_{15}, G_{19}, F_{23}$     $K_4, J_8, I_{12}, H_{16}, G_{20}, F_{24}$

If the 24 images of the traces of the original seismogram F are now considered it will be seen that in the derived seismogram the images of the six traces each from a different original seismogram should be projected between the images of traces $F_4$ and $F_5$, $F_8$ and $F_9$, $F_{12}$ and $F_{13}$, $F_{16}$ and $F_{17}$, $F_{20}$ and $F_{21}$. However, between all the other pairs of consecutive traces of seismogram F the images of only five traces of the other seismograms are found. In a similar manner it will be seen that the images of six traces of other seismograms must be projected between the images of the traces $G_4$ and $G_5$, $G_8$ and $G_9$, $G_{12}$ and $G_{13}$, $G_{16}$ and $G_{17}$, $G_{20}$ and $G_{21}$. Between the other images of the traces from seismogram G there are projected only five images. As far as each original seismogram is concerned the situation in this special case is that between the images of the 4th and 5th trace, the 8th and 9th trace, the 12th and 13th trace, the 16th and 17th trace, and the 20th and 21st trace, the images of six traces, each from a different original seismogram have to be reproduced, space for five images being necessary between the remaining images.

The dimensions of the optical system will now be discussed in greater detail with reference to the FIGURES 6a, 6b and 6c. All traces (in the present case 24) of an original seismogram are simultaneously reduced and if necessary shifted laterally by means of the optical system.

Figure 6A:
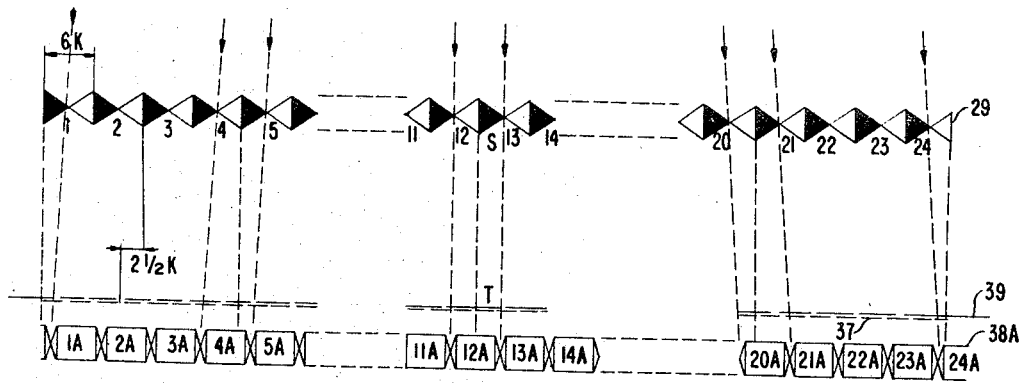
FIGURES 6A, 6B and 6C illustrate the operation of the optical system shown in FIGURES 4 and 5.
Figure 6B:
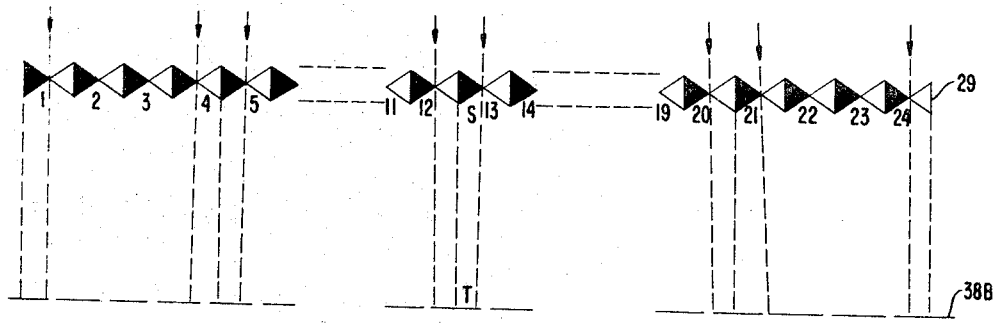
Figure 6C:
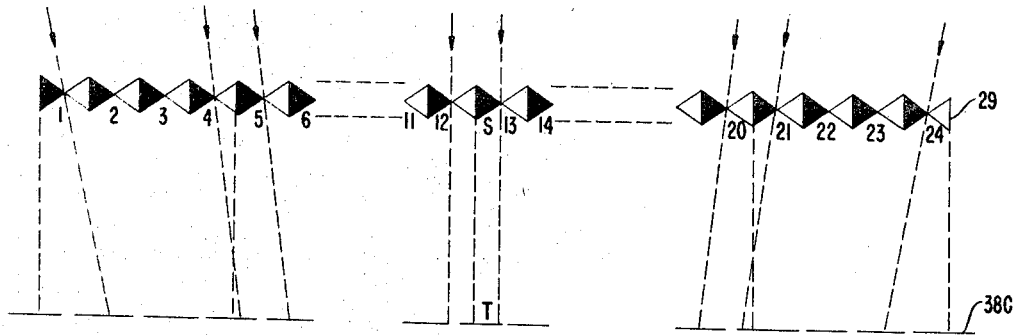

With reference to FIGURE 6a the optical system of FIGURE 5 is shown on an enlarged scale; there are 24 lenses 37 and a mask 38a present. The figure shows diagrammatically (by means of black and white triangles) a section of an original seismogram 29 having 24 traces, numbered 1 to 24 inclusive. A diaphragm 39 is arranged in front of the optical system to prevent light passing between the lenses. As already noted, the mask is situated in the plane in which the traces are reproduced by the lenses 37. These images are designated by the numerals 1a to 24a inclusive. The figure also shows the mid-perpendicular ST, while in addition the width of the slits and the slit distance in the mask have been expressed in terms of a magnitude k. The FIGURES 6b and 6c likewise show the traces, together with the masks 38b and 38c respectively. Moreover, several beams of light are diagrammatically shown in these figures by means of broken lines with arrows.

The optical system portrayed in FIGURE 6a comprises 24 cylindrical lenses 37, which are focused on the 24 traces of the original seismogram (shown in cross section). The longitudinal direction of the lenses is that normal to the plane of the drawing. In a practical embodiment these lenses are 4 mm. wide and 2 cm. long.

The mask 38a is made from a photographic plate on which the slits—one opposite each lens—are formed by transparent lines of the same width, preferably the width of a reproduced trace. The distances between the slits are chosen in such a way that the latter are grouped exactly in accordance with the desired formation of the traces reproduced in the derived seismogram. This means that for a six-fold source of information obtained in the manner described above, and composed in the sequence given, the distance between the slits 4–5, 8–9, 12–13, 16–17 and 20–21 must be equal to six times the width of a slit, while the distance between the other slits will be equal to five times the width of a slit. The dimensions of the mask are determined by the width of a trace on the original seismogram, the information number (in this case 6), the optics in the device in which the optical system is being used, and—as has already been pointed out—by the sequence in which the traces are reproduced in the derived seismogram.

If it is assumed that the width of an original trace is 6k, then the lenses will preferably be so chosen and positioned that the width of the reproduced trace will be k. Consequently, the width of every slit in the mask will be equal to R. The distances which have to be maintained between the slits can be seen from the above-mentioned statement of the sequence in which the traces must be reproduced. These distances are expressed in terms of k, and are given in FIGURE 6a. A mask of this type is preferably made by first accurately drawing the mask on an enlarged scale and subsequently reducing it to the actually required dimensions with the aid of a camera, which prevents the introduction of distortions.

The total width of the mask measured from one furthest outside edge to the other furthest outside edge of the slits is now equal to 144k, and this is equal to the total width of 24 traces each 6k wide, i.e. equal to the width of the original seismogram. When being reproduced, the original seismogram is positioned in such a way that the edges of the seismogram are situated exactly vertically above the said edges of the mask. The center of the original seismogram, therefore, lies vertically above the center of the mask (see the perpendicular line ST). Since each of the traces is reproduced exactly on the slits, the resultant image is symmetrical with respect to the center.

Examining first of all the traces 1, 2, 3 and 4 of the original seismogram, it will be found that the images 1a, 2a, 3a and 4a of these traces have been shifted to the left by a distance of 2½k with respect to the original traces. For example, the left-hand edge of the image 1a of trace 1 lies vertically below the left-hand edge of trace 1; this means that the center of the image 1a (which has a width 1k) has been shifted to the left by a distance of 2½k with respect to the center of the original trace 1 (which had a width of 6k). The same is true of the traces 2, 3 and 4, and their images 2a, 3a and 4a. In view of the extra space required between the images 4a and 5a the following group of 4 images viz. 5a, 6a, 7a and 8a is only shifted to the left by a distance of 1½k. The shift to the left of the images 9a, 10a, 11a and 12a only amounts to ½k. The reproduction of the seismogram is symmetrical with respect to the center, so that a similar consideration (although this time with a shift to the right) applies for the groups: 24a, 23a, 22a and 21a (2½k to the right); 20a, 19a, 18a and 17a (1½k to the right); 16a, 15a, 14a and 13a (1½k to the right).

In practice these 24 images can only be obtained if the light beams used to produce the images pass each trace in a direction such that they can reach the corresponding slit in the mask; in other words, the slits must be so positioned relative to the traces that the available light does in fact reach them. With reference to FIGURE 6a, for instance, the mask shown here is found to be less suitable for use in the apparatus according to FIGURE 4. The mask 38 (which is a part of the optical system 31) in this apparatus is situated behind the lens 30, where the light is convergent, while the mask 38a of FIGURE 6a requires divergent light, a fact which follows directly from the outward shift, discussed above, of the image with respect to the original seismogram. By means of a scale reduction, as explained hereinafter, the mask and with it the optical system can, however, be adapted to both parallel and convergent light.

In order to fit the optical system for parallel light the mask must be modified in such a manner that the shifts are minimal, so that the images lie as as vertically as possible under the traces of the original seismogram. This can be achieved by reducing the size of the whole mask, so that each slit ends up closer to the center of the mask.

The displacement of the separate images is smallest when the average displacement (shift) of each of the groups of four images—e.g. the group consisting of the images 1a, 2a, 3a and 4a—is zero. This is effected by multiplying the dimensions of the mask by a reducing factor X. This factor is so chosen that the distance of each group of four slits from the center of the mask is reduced by a distance which is equal to the average shift of the relevant group of images. The consequence of the reduction is that the center of each group of four slits comes just below the center of the corresponding group of four traces of the original seismogram. It can be easily shown that the reducing factor must be equal to $$N/N+1$$

wherein N=number of traces in the seismogram. In the present case the reducing factor is therefore 24/25; this case is shown in FIGURE 6b. The reduced mask, which is designated by the reference numeral 38b, is now suited for use with light which is parallel or at least substantially parallel.

The resultant optical system can now be positioned in front of the lens 30 (where the light is more or less parallel). In this case, however, the image passing from the mask 38b onto the film 34 will also be influenced by the lens 30; accordingly, this lens must meet very rigorous requirements in order to ensure that the reproduction of the accurately dimensioned mask is kept free from distortions. For this reason the optical system is preferably placed behind the lens 30, as has already been shown in FIGURE 4.

In order to adapt the optical system to the convergent beam of light behind lens 30 the lens will also have to be even further reduced by an additional factor Y. This factor is determined by the focal distance $f$ of lens 30 and the distance $a$ between the lens 30 and the mask 38:

$$Y = \frac{f-a}{f}$$

The width $g$ of the slits then equals:

$$g = \frac{d}{m} \cdot \frac{N}{N+1} \cdot \frac{f-a}{f}$$

In the above formula $d$ is the width of a trace on the original seismogram and $m$ is the information number. FIGURE 6a shows a drawing of a mask 38a, which has been derived from the original mask 38 in this manner.

The influence which the sequence in which the consecutive original seismograms are reproduced in the derived seismogram has on the dimensions of the mask will now be further examined. If, for example, the traces from a following seismogram (for instance B from FIGURE 3) are reproduced just to the right of the corresponding traces of the preceding seismogram (A) the derived seismogram will have the following shape:

| | |
|---|---|
| $A_{21}$, $B_{17}$, $C_{13}$, $D_9$, $E_5$, $F_1$ | $A_{22}$, $B_{18}$, $C_{14}$, $D_{10}$, $E_6$, $F_2$ |
| $A_{23}$, $B_{19}$, $C_{15}$, $D_{11}$, $E_7$, $F_3$ | $A_{24}$, $B_{20}$, $C_{16}$, $D_{12}$, $E_8$, $F_4$ |
| $B_{21}$, $C_{17}$, $D_{13}$, $E_9$, $F_5$, $G_1$ | $B_{22}$, $C_{18}$, $D_{14}$, $E_{10}$, $F_6$, $G_2$ |
| $B_{23}$, $C_{19}$, $D_{15}$, $E_{11}$, $F_7$, $G_3$ | $B_{24}$, $C_{20}$, $D_{16}$, $E_{12}$, $F_8$, $G_4$ |
| $C_{21}$, $D_{17}$, $E_{13}$, $F_9$, $G_5$, $H_1$ | $C_{22}$, $D_{18}$, $E_{14}$, $F_{10}$, $G_6$, $H_2$ |
| $C_{23}$, $D_{19}$, $E_{15}$, $F_{11}$, $G_7$, $H_3$ | $C_{24}$, $D_{20}$, $E_{16}$, $F_{12}$, $G_8$, $H_4$ |
| $D_{21}$, $E_{17}$, $F_{13}$, $G_9$, $H_5$, $I_1$ | $D_{22}$, $E_{18}$, $F_{14}$, $G_{10}$, $H_6$, $I_2$ |
| $D_{23}$, $E_{19}$, $F_{15}$, $G_{11}$, $H_7$, $I_3$ | $D_{24}$, $E_{20}$, $F_{16}$, $G_{12}$, $H_8$, $I_4$ |
| $E_{21}$, $F_{17}$, $G_{13}$, $H_9$, $I_5$, $J_1$ | $E_{22}$, $F_{18}$, $G_{14}$, $H_{10}$, $I_6$, $J_2$ |
| $E_{23}$, $F_{19}$, $G_{15}$, $H_{11}$, $I_7$, $J_3$ | $E_{24}$, $F_{20}$, $G_{16}$, $H_{12}$, $I_8$, $J_4$ |

In general five other traces will now have to be reproduced between the images of the traces of a seismogram, for example seismogram F, with the exception of the pairs $F_4$ and $F_5$, $F_8$ and $F_9$, $F_{12}$ and $F_{13}$, $F_{16}$ and $F_{17}$ and $F_{20}$ and $F_{21}$, between which four other traces will invariably be reproduced. The configuration of the mask is thus influenced by altering the sequence in which the traces are adjacently reproduced.

Figure 7:
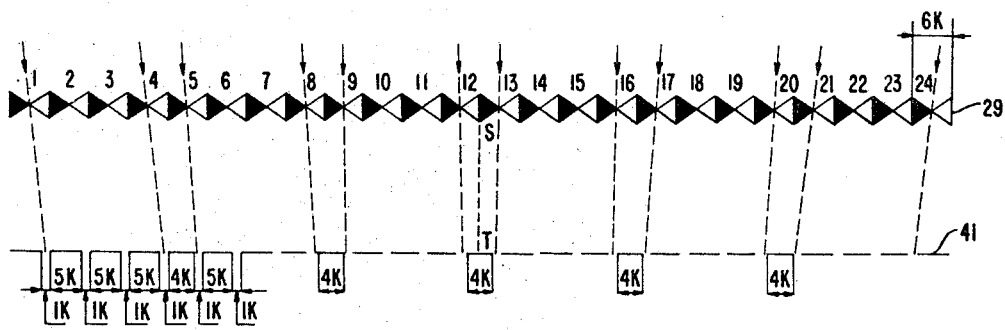
FIGURE 7 illustrates the dimensions of the mask used in the optical system shown in FIGURES 4 and 5.

FIGURE 7 shows the shape which the mask will have in the event of the following slit width:

$$g = d/6 = 6k/6 = k$$

This figure again shows a section of a seismogram 29 with 24 traces, and includes a mask 41 and a number of light beams. The width of each of the slits and the distances between the slits are expressed in terms of $k$. The total width of the mask in this case only amounts to $134k$. Since the original seismogram and the mask are so positioned that their centers S and T respectively are situated vertically below one another it follows immediately that the mask can be used in convergent light.

In conclusion, it should be noted that although the invention has been discussed with reference to seismograms which have been obtained by the field technique described with reference to FIGURE 1, the invention is not in any way restricted to the use of such seismograms.

Figure 8:
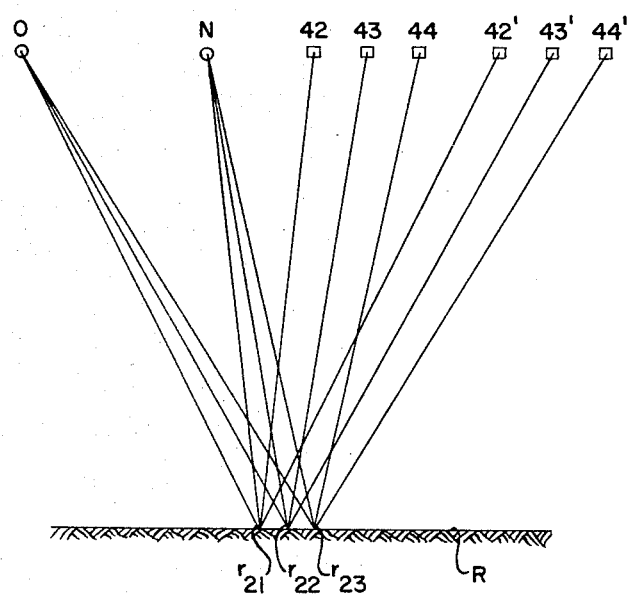
FIGURE 8 illustrates a second method for obtaining a plurality of seismograms from a common reflection point.

Another field technique will now be discussed with reference to FIGURE 8. Two shot points are shown, designated by N and O. R is an underground reflecting layer having the reflection points $r_{21}$, $r_{22}$ and $r_{23}$. Three geophones are shown with the numbers 42, 43 and 44, and 42′, 43′ and 44′, respectively. The procedure in the field is as follows: A seismic pulse is generated in the shot point N. The resulting seismic waves reflect against the reflecting layer R, inter alia in the points $r_{21}$, $r_{22}$ and $r_{23}$ and are subsequently received by the geophones 42, 43, and 44, it being understood that the wave reflecting in $r_{21}$ is received by geophone 42, the wave from $r_{22}$ by geophone 43 and the wave from $r_{23}$ by geophone 44. The signals produced by the geophones are recorded in a seismogram in which, in this case, three traces are situated next to one another. Subsequently, the shot point and the geophones are shifted over a like distance, but in opposite directions. The seismic waves, which arise as a result of the pulse generated in the shot point O are received by the same three geophones (42′, 43′, 44′), which have now, however, been shifted relative to the reflection points. As a consequence of these displacements the signals produced, and therefore the second seismogram, likewise relate to the reflection points $r_{21}$, $r_{22}$ and $r_{23}$. In fact, of course, the reflection points $r_{21}$, $r_{22}$, etc. are small areas around these points. If there are several reflecting layers there are also more of these reflecting areas per "reflection point" which lie more or less vertically one below the other (depending on the slope of the layers).

In the manner described, two seismograms have now been obtained, with, in each case, two traces relating to the same reflection point or reflecting area (i.e. twofold information). The first seismogram contains the traces $N_1$, $N_2$ and $N_3$ and the second seismogram contains the traces $O_1$, $O_2$ and $O_3$, traces $N_1$ and $O_1$ relating to $r_{21}$, traces $N_2$ and $O_2$ relating to $r_{22}$ and traces $N_3$ and $O_3$ relating to $r_{23}$. Of course, it is possible to obtain three-fold, four-fold, five-fold, six-fold etc. information in this manner.

FIGURE 9 shows symbolically the traces obtained by the technique described with reference to FIGURE 8. In this figure the letters N, O, P, Q, U and V indicate six original seismograms. Each of these seismograms is the recorded result of one seismic pulse. Twenty-four geophones were used and accordingly each seismogram comprises 24 traces which are represented symbolically by means of the numerals 1 to 24 inclusive. Together the seismograms N, O, P, Q, U and V form a six-fold source of information concerning the soil to be investigated. The figure shows which traces form the various original seismograms belong together; these traces are represented vertically one below the other.

In the derived seismogram, which can be obtained with the aid of these traces, the sequence of the separate traces can be chosen as follows, for example:

$N_1$, $O_1$, $P_1$, $Q_1$, $U_1$, $V_1$, $N_2$, $O_2$, $P_2$, $Q_2$, $U_2$, $V_2$
$N_3$, $O_3$, $P_3$, $Q_3$, $U_3$, $V_3$, $N_4$, $Q_4$, $P_4$, $Q_4$
$U_4$, $V_4$, $N_5$ . . . $N_{24}$, $O_{24}$, $P_{24}$, $Q_{24}$, $U_{24}$, $V_{24}$

In the derived seismogram between *every* two images of two consecutive traces of (for example) seismogram N, five traces from other seismograms will now be present. This is also true of all other original seismograms.

Figure 10:
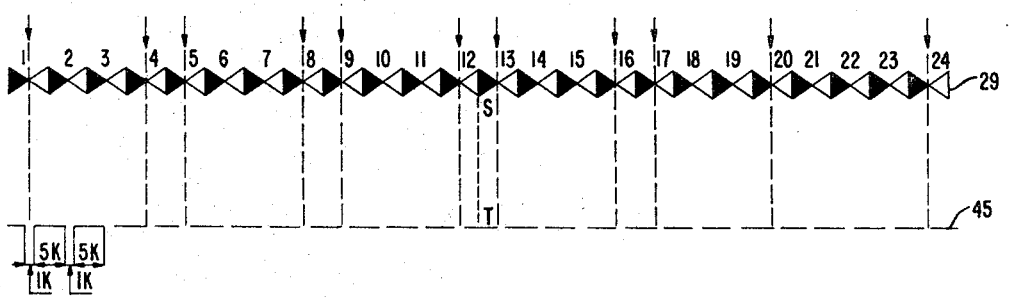
FIGURE 10 illustrates the optical system for reproducing the seismograms obtained by the method of FIGURE 8.

The optical system, used for a seismogram of this type, is far easier to make than was the case with previous examples as a result of its great degree of regularity. FIGURE 10 shows diagrammatically the construction of the appurtenant mask 45. Each of the images of the traces (1 to 24 inclusive) of the original seismogram 29 is projected vertically below the traces. If the desired width of each image, i.e. of each slit is $$g = d/6 = 6k/6 = k$$

then the distance between two consecutive slits is $5k$, i.e. the space necessary for five images. As it stands this mask is suitable for use with parallel light, and can similarly be adapted for use with convergent light as discussed above.

Although the optical system according to FIGURE 10 is much simpler than the optical systems discussed earlier, it is of less importance in practice since the field technique used with it is very difficult to carry out. This field technique, indeed, does not permit of any continuous operation in one given direction.

In the applications described above the transport system, film 34 with respect to seismogram 29, was moved continuously in the same direction and over the same distance. It is, however, possible to project the traces adjacently in the derived seismogram in other ways, whereby the transport device should be moved variously over unequal distances and even in opposite directions. Purely practical considerations, however, make such methods hardly or not at all suitable for use in practice.

Although hereinbefore the optical system has been considered in terms of a mask with slits, opposite each of which a lens is arranged, the optical system can nevertheless be made from a solid piece of transparent material. The lenses can be arranged on one side thereof by means of milling, for instance. On the other side transparent slits (one opposite each lens) can be created by making the rest of the material opaque; the masks discussed earlier can also be used.

I claim as my invention:

1. A process for the production of a derived seismogram from a plurality of original seismograms, said original seismograms forming a multiple source of information concerning the soil being investigated, said process comprising:
reproducing the original seismograms by means of an optical system on a light-sensitive medium, the traces of the original seismogram that originate from the same reflection point being reproduced together;
reducing the trace width while maintaining substantially the original trace distance;
after the reproduction of a trace from the original seismogram shifting the light-sensitive medium relative to the optical system in a direction normal to the longitudinal direction of the traces; and
continuing to reproduce traces of the original seismogram and shift the light-sensitive medium until all traces on the original seismogram are reproduced.

2. The process of claim 1 wherein the trace width is reduced by a factor substantially equal to the number of juxtaposed traces originating from the various original seismograms and forming one group of traces in the derived seismogram.

3. The process of claim 1 wherein the reproduction of the traces of the original seismograms is effected point by point along the longitudinal axis of the seismogram.

4. An optical system for producing derived seismograms from a number of original seismograms wherein the original seismograms form a multiple source of information concerning the soil to be investigated, said optical system comprising:
a light-sensitive medium;
a transport means, said light-sensitive medium being mounted on said transport means, said original seismogram also being mounted on said transport means, said transport means simultaneously moving both the original seismogram and light-sensitive medium in a longitudinal direction relative to the optical system;
said transport means in addition including means to shift said light-sensitive medium in a direction normal to the longitudinal direction of the traces;
a mask, said containing one slit for each trace on the original seismogram;
a plurality of lenses, one of said lenses being positioned opposite each slit in said mask, said lenses in addition being positioned to reduce the trace width of the original seismogram trace by a factor of $1/k$ where $k$ is the number of individual traces to be composited.

5. The system of claim 4 wherein said lenses are cylindrical lenses positioned parallel with the slits.

6. The system of claim 4 wherein the width of each slit in the mask is equal to $1/k$.

References Cited

UNITED STATES PATENTS 2,944,620    7/1960    Van Dijck    88—24
3,143,946    8/1964    Merten    88—24

NORTON ANSHER, *Primary Examiner.*

R. L. MOSES, *Assistant Examiner.*

U.S. Cl. X.R.

95—75; 181—0.5; 346—33, 107, 108